June 30, 1959  J. E. STAATS  2,892,917
AUTOMATIC TEMPERATURE CONTROL SYSTEM
Filed Sept. 29, 1958

INVENTOR.
JAMES E. STAATS
BY T.G. Dupont
HIS ATTORNEY

United States Patent Office

2,892,917
Patented June 30, 1959

2,892,917

AUTOMATIC TEMPERATURE CONTROL SYSTEM

James E. Staats, Louisville, Ky., assignor to General Electric Company, a corporation of New York Application September 29, 1958, Serial No. 764,022

2 Claims. (Cl. 219—20)

This invention relates to automatic temperature control systems, and has as its general object the provision of a system of this type particularly suited to the control of a surface cooking unit during both boiling and frying operations.

Further objects and advantages of this invention will become apparent as the following description proceeds, and the features of novelty which characterize the invention will be pointed out with particularity in the claims annexed to and forming a part of this specification.

Briefly stated, in accordance with one aspect of my invention I provide a control circuit for an electric heater which includes a thyratron controlled power relay, a voltage proportioning network connected to the control grid of the thyratron so that a composite bias voltage is supplied thereto, a thermistor responsive to the temperature of the material being heated arranged in circuit with the network, and a gas diode tube oscillator circuit associated with the network, the bias voltage on the control grid of the thyratron thus being proportional to the temperature of the thermistor and periodically varied by means of the oscillator circuit, thus providing means for energizing and de-energizing the heater under constant temperature (i.e., boiling) conditions.

For a better understanding of this invention, reference may be made to the following description and the accompanying drawing in which.

Figure 1:
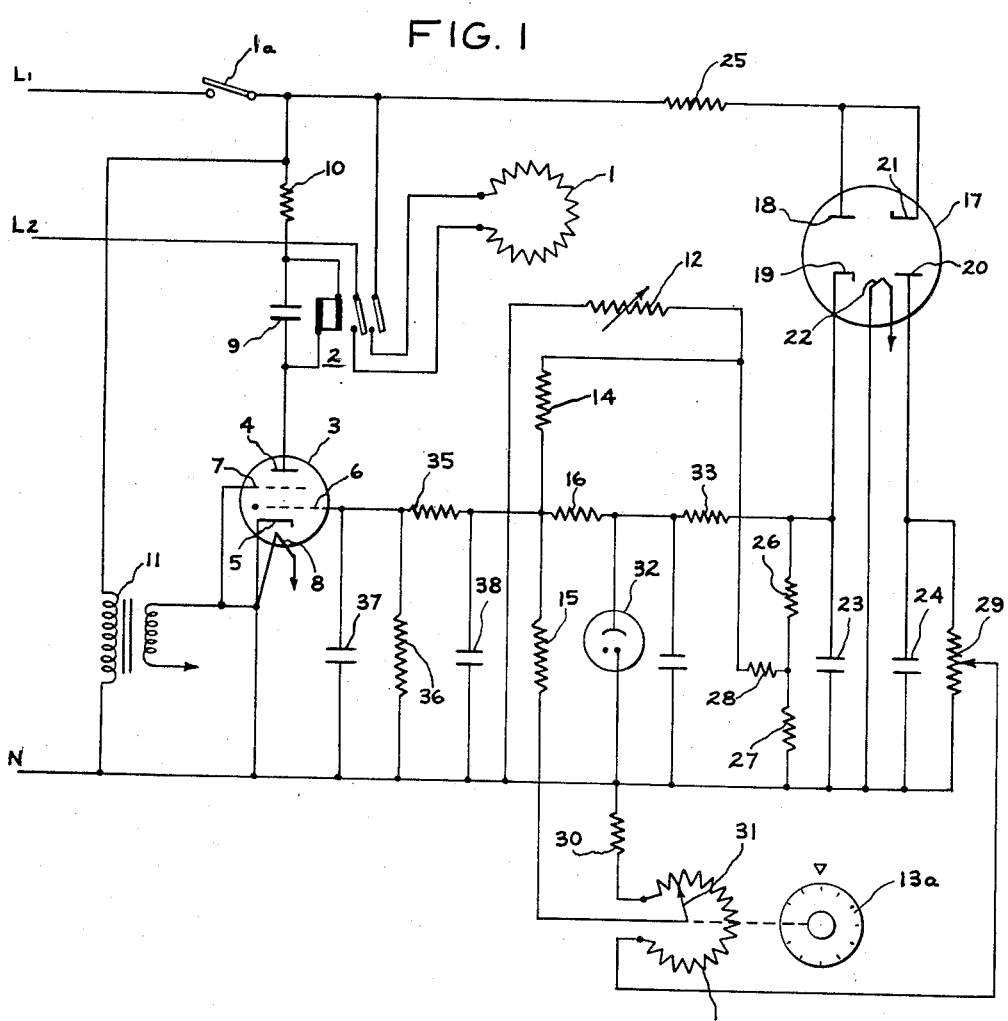
Fig. 1 is a circuit diagram illustrating an embodiment of my invention.

While this invention may be used in other applications, it is particularly suited to the control of a surface cooking unit in accordance with the temperature of a utensil resting thereon. Thus the invention may be utilized to control a surface cooking unit provided with a centrally mounted temperature detector of the type having a thermistor arranged to contact a cooking utensil resting thereon, such as that disclosed in Skala Patent No. 2,813,962 assigned to the assignee of the present application. An important requirement of a control system for surface cooking units is that it be capable of controlling the heat output of the unit during boiling (i.e., constant temperature) operations as well as in frying operations in which a predetermined temperature must be maintained. In other words, since water remains at a constant temperature while boiling, some means must be employed to regulate the heat output of the heating unit so as to afford the user a number of boiling rates varying from "simmer" to a high or "rolling" boil.

Referring to the drawing, the numeral 1 designates an electric heating unit, such as the sheathed surface cooking unit disclosed in the aforementioned Skala patent, arranged to be energized from a three wire alternating current power source including supply lines L1, L2 and a neutral line N. Power from lines L1 and L2 is supplied to heating unit 1 through a line switch 1a and a control relay 2, the coil of which is arranged to be energized by a gaseous discharge tube 3 connected in circuit therewith across lines L1 and N. Gaseous discharge tube 3 is preferably of the thyratron type and includes an anode 4, a cathode 5, a control grid 6, a shield grid 7 and a filament heater 8. A filter capacitor 9 is connected in parallel with the coil of relay 2, and a protective resistor 10 is preferably connected in the circuit between relay 2 and supply line L1. A filament voltage transformer 11 is connected across lines L1 and N, and its secondary is connected so as to supply current to filament 8 of thyratron 3.

It will be understood that continuous flow of current through thyratron 3 occurs only when the bias voltage on control grid 6 is above a predetermined cut-off value, and that the thyratron is rendered non-conducting whenever the bias voltage falls below this cut-off value. In accordance with the present invention, a voltage proportioning network supplies a composite bias voltage to control grid 6, the composite voltage being the algebraic sum of a voltage proportional to the temperature of the material heated by heating unit 1, and preferably a second voltage proportional to a desired (manually variable) temperature setting, and a third voltage which periodically varies between fixed limits. Further, in accordance with this invention the periodically varying third voltage is supplied by a gas diode tube oscillator circuit arranged to provide a voltage signal which, under constant temperature conditions, is sufficient to cause thyratron 3 to periodically fire, thus causing heating unit 1 to be periodically energized.

The temperature of the material being heated by heating unit 1 is sensed by a thermistor 12 which, of course, varies in resistance in accordance with its temperature. A manually variable resistor 13 which may be actuated by means of a knob 13a is provided so as to permit the user to select the temperature to be maintained. Thermistor 12 and variable resistor 13 are connected in a voltage proportioning network which includes proportioning resistors 14, 15 and 16 and which is supplied with direct current by suitable rectifying means such as a vacuum tube rectifier 17. Rectifier 17 includes an anode 18, a cooperating cathode 19, another anode 20 and a cooperating cathode 21, and a filament heater 22 energized from the secondary of transformer 11. Rectifier 17 is connected across lines L1 and N, suitable filter capacitors 23 and 24 being connected in circuit with cathode 19 and anode 20 respectively. Preferably, a protective resistor 25 is also connected in circuit with the rectifier.

Rectifier 17 supplies direct currents of opposite polarity, through separate circuits, to thermistor 12 and variable resistor 13. In order to match the voltage supplied to thermistor 12 to its range of resistances, and to correct for non-linearity of its resistance changes, current from rectifier 17 is supplied thereto through a voltage divider circuit including resistors 26 and 27, and a compensating resistor 28. While thermistor 12 may be connected directly in series with resistor 28 and voltage proportioning resistor 14, it is desirable to have one terminal of the thremistor grounded, and hence thermistor 12 may be connected to the junction of resistors 14 and 28 and to the neutral line N as shown in Fig. 1. It will be evident that the voltage appearing at the junction of resistors 14, 15 and 16 will vary in accordance with variations in the resistance of thermistor 12 regardless of whether the thermistor is connected directly in series with resistor 14 or as shown in Fig. 1.

Direct current from rectifier 17 to variable resistor 13 is supplied through a circuit including calibration potentiometer 29 so that variances from the rated values of the various components of the system may be compensated for by suitable adjustment. Variable resistor 13 is preferably connected to the neutral line N by a limiting resistor 30, the voltage representing the pre-selected temperature being supplied to voltage proportioning resistor 15 through movable wiper arm 31.

From the description thus far, it will be seen that the voltage appearing at the junction of proportioning resistors 14, 15 and 16 is a composite voltage corresponding to the algebraic sum of separate voltages proportional to the temperature of thermistor 12 and the setting of variable resistor 13. Hence the circuit as described thus far would be operative to control the operation of a surface cooking unit so as to maintain a griddle, for example, at a constant temperature. However, it is also desirable that some means be provided for controlling the heat input to a boiling load, and in accordance with the present invention there is provided a gas diode tube 32, a resistor 33, and a capacitor 34 connected in an oscillator circuit which is supplied with direct current from rectifier 17 through a portion of the same circuit that supplies thermistor 12 with direct current. It will be understood that gas diode tube 32 is so constructed that it is periodically rendered alternately conducting and non-conducting, and that when such a tube is connected as shown in Fig. 1 oscillations are produced in the portion of the circuit comprising resistor 33 and capacitor 34. Thus, since these circuit elements are connected to the junction point of resistors 14 and 15 by means of a suitable proportioning resistor 16 the composite voltage at this point is periodically varied at a rate determined by the characteristics of gas diode 32.

It will now be understood that the composite voltage signal appearing at the junction of resistors 14, 15 and 16 is impressed on the control grid 6 of thyratron 3 and thus regulates the operation of the thyratron in controlling relay 2, and hence the energization of heating unit 1. Preferably a grid filter network including resistors 35, 36 and capacitors 37, 38 is interposed between the aforementioned junction point and control gird 6, for reasons which will be apparent to those skilled in the art.

Figure 2:
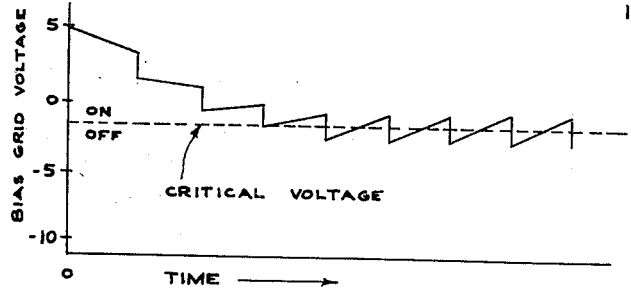
Fig. 2 is a graphical representation illustrating the operation of my invention.

Referring now to Fig. 2, the mode of operation of my invention will become apparent. In describing the graph shown therein, it will be assumed that the cooking utensil or other material to be heated by heating unit 1 is cold and that line switch 1a is closed and variable resistor 13 is set to the desired temperature at time zero. Under these conditions, the composite voltage appearing at the junction point of resistors 14, 15 and 16 is considerably above the critical or "cut-off" voltage of thyratron tube 3 and hence the thyratron will fire so as to close relay 2 and energize the heating unit. As the temperature of the utensil or other material rises, the temperature of thermistor 12 also rises at a corresponding rate and consequently the bias voltage on control grid 6 decreases. In the meantime, the gas diode oscillator circuit made up of diode 32, resistor 33 and capacitor 34 has been energized and causes a periodic variation in the bias voltage. Nevertheless, during the early stages of the heating process the bias voltage remains above the cut-off point throughout the oscillation cycle and relay 2 remains energized. However, as the temperature of thermistor 12 approaches the preselected temperature the bias voltage on control grid 6 is reduced to the cut-off value at which time current flow through thyratron 3 and relay 2 is interrupted and heating unit 1 is momentarily de-energized. Thereafter the composite voltage resulting from current flowing in resistors 14 and 15 remains substantially constant and the bias voltage is periodically varied by oscillations in the gas diode oscillator circuit. Hence, it will be seen that if a utensil containing water (which necessarily remains at a constant temperature while the water is boiling) is being heated, heating unit 1 will be periodically energized and de-energized at a rate depending upon the precise setting of temperature selector knob 13a. Thus a high boil rate may be obtained by setting knob 13a so that the lower peaks of the bias voltage curve shown in Fig. 2 barely touch the dotted line representing the critical voltage of the thyratron, and conversely a very low or simmer boiling rate may be obtained by setting knob 14 so that the upper peaks of the bias voltage curve are barely above the critical voltage line.

While I have shown and described a particular embodiment of my invention, I do not desire the invention to be limited to the particular construction disclosed, and I intend by the appended claims to cover all modifications within the true spirit and scope of my invention.

What I claim is:

1. An automatic temperature control system for a heating unit comprising an electric relay adapted to be connected to a power source and arranged to control the supply of energy to the heating unit, a gaseous discharge tube including a control grid and a cathode and an anode, said gaseous discharge tube being connected in circuit with said relay so as to control energization of said relay in accordance with the bias voltage on said control grid, a voltage proportioning network connected to said control grid so as to supply a composite bias voltage thereto, a manually variable resistor for selecting desired temperatures, a thermistor arranged to be in heat transfer relation with the material heated by said heating unit, said resistor and said thermistor being connected in said network so that said bias voltage varies in accordance with the setting of said resistor and the temperature of said thermistor, a gas diode tube connected in circuit with a resistor and a capacitor to form an oscillator circuit, said oscillator circuit being connected in said network so that said bias voltage is periodically varied, and rectifier means for supplying direct current to said resistor and said thermistor and said oscillator circuit.

2. An automatic temperature control system for a heating unit comprising an electric relay adapted to be connected to a power source and arranged to control the suply of energy to the heating unit, a gaseous discharge tube including a control grid and a cathode and an anode, said gaseous discharge tube being connected in circuit with said relay so as to control energization of said relay in accordance with the bias voltage on said control grid, a voltage proportioning network connected to said control grid so as to supply a composite bias voltage thereto, a manually variable resistor for selecting desired temperatures, a thermistor arranged to be in heat transfer relation with the material heated by said heating unit, said resistor and said thermistor being connected in said network so that said bias voltage varies in accordance with the setting of said resistor and the temperature of said thermistor, a gas diode tube connected in circuit with a resistor and a capacitor to form an oscillator circuit, said oscillator circuit being connected in said network so that said bias voltage is periodically varied, and rectifier means for supplying direct current to said network, said rectifier means including a vacuum tube rectifier arranged to supply through separate circuits direct current of one polarity to said thermistor and said oscillator circuit and direct current of opposite polarity to said resistor.

References Cited in the file of this patent

UNITED STATES PATENTS

| | | |
|---|---|---|
| 2,505,565 | Michel et al. | Apr. 25, 1950 |
| 2,518,108 | York et al. | Aug. 8, 1950 |
| 2,819,371 | Aldrich et al. | Jan. 7, 1958 |